United States Patent [19]
Sutton

[11] Patent Number: 5,880,771
[45] Date of Patent: Mar. 9, 1999

[54] ELECTRO-OPTICAL DETECTION SYSTEM

[75] Inventor: Philip Sutton, Hamshire, England

[73] Assignee: The Secretary of State for Defence in Her Britannic Majesty's Goverment of the United Kingdom of Great Britain and Northern Ireland, London, England

[21] Appl. No.: 364,685

[22] Filed: May 9, 1989

[30]   Foreign Application Priority Data

May 13, 1988 [GB] United Kingdom ............... 8811355

[51] Int. Cl.⁶ .................... H04N 7/00; H04N 5/33
[52] U.S. Cl. ............................ 348/31; 348/164
[58] Field of Search ............... 358/95, 99, 109; 348/31, 164

[56]   References Cited

U.S. PATENT DOCUMENTS

4,661,907  4/1987  Arnone ..................... 358/109
4,862,257  8/1989  Ulich ........................ 358/95

Primary Examiner—Stephen C. Buczinski
Attorney, Agent, or Firm—Nixon & Vanderhye P.C.

[57] ABSTRACT

An electro-optical detection system for detecting objects embedded in a partially transmitting medium. The system includes a receiver for receiving electromagnetic radiation and a device for separating the received radiation into two separate spectral channels. A detector in each of the spectral channels for providing a signal indicative of the received radiation in each spectral channel. A signal processor, responsive to the outputs of the detectors, having a signal channel where transmission of light of the signal channel wavelength in the medium is high and having a reference channel where attenuation of light of the reference channel wavelength in the medium is high. The signal processor ensures that the reflected light at both signal and reference wavelengths are of similar intensity and geometric distribution. A subtractor provides a difference output in which the signal and reference channels are subtracted, removing the effect of reflected light.

18 Claims, 7 Drawing Sheets

ELECTRO-OPTICAL DETECTION SYSTEM

The invention relates to electro-optical detectors and in particular, but not exclusively, to a system for detecting objects submerged in water.

During wartime a serious threat exists from contact mines moored to the sea bed and floating relatively close to the sea surface. Mine hunter/sweepers have the capability of bringing an unexploded mine to the surface by breaking the mine mooring cable by use of explosive cutters fitted to sweep wires. Once on the surface the mine can then be safely exploded. However, whilst sweeping, the forward minehunter is itself vulnerable to striking mines within its draft. Currently, observers on the vessel or in a low flying helicopter try to visually detect mines in the path of the vessel. Such visual sightings are difficult because of reflection of light from particulate matter etc within the water as well as from the surface of the water.

Polarisation processing is not a significantly useful image processing technique for removing sea surface glare because light is only significantly linearly polarised when the illuminating source and the observer form the Brewster angle with the reflecting surface normal. Since the source (the sky) is spatially extended and the reflecting surface is highly structural because of waves, sea reflections are poorly polarised.

The object of the invention is to provide an electro-optical detection system capable of improved detection of submerged objects.

The invention provides:
an electro-optical detection system for detecting objects embedded within a partially transmitting medium comprising:
  a. means to receive electromagnetic radiation;
  b. means to separate the received radiation into two spectral channels;
  c. detectors responsive to electromagnetic radiation and located to receive radiation in the respective channels; and
  d. a signal processor connected to the output of the detector;
the processor comprising:
  a signal channel wherein the wavelength and bandwidth of the signal channel are optimised to correspond to the peak of transmission of the medium and to give a high signal to noise ratio;
  a reference channel wherein the wave length and bandwidth are selected to correspond to a spectral region where attenuation in the medium is high but which is close to the signal wavelengths thereby ensuring that reflected light at both signal and reference wavelengths are of similar intensity and geometric distribution; and
  a subtractor wherein the signal and reference channels are subtracted so as to remove the effect of reflected light.

For a system capable of detecting objects underwater the signal channel preferably is in the waveband 400 nm to 570 nm and the reference channel is in the waveband 570 nm to 700 nm. Electro-magnetic radiation reflected from the sea surface is spectrally broadband, covering the signal and reference wavelength range from 400 nm to 700 nm. By contrast, radiation scattered or reflected from objects below the surface is mainly blue-green (400 nm–570 nm) because water attenuates red (570 nm–700 nm) very strongly. Thus the signal processor is advantageously arranged such that the signal and reference channels are combined by analogue subtraction to remove sea surface effects. Preferably the analogue subtracted signal is connected to a variable offset DC control so that a positive going signal results from the subtraction. The resulting signal is then connected to an adder where the necessary sync pulses are added to produce a video signal for operation of a video monitor.

Advantageously the video signal is processed digitally using, for example, contrast stretch to provide an enhanced image of the field of view. Digital processing options may also include edge enhancement, frame to frame integration, pseudo-colour coding and invert video. After digital processing the signal is digital to analogue converted and then connected to a TV monitor. After digital processing the digital signal may be connected to an automatic detection system using standard image processing techniques (noise reduction, segmentation, edge mapping, spatial filtering and track formation) to give an automatic visual and audio cue through the monitor. In one form the means to receive the radiation from the field of view comprises a single chromatically corrected lens; radiation transmitted by the lens being spectrally divided to provide at least two separate images, a two dimensional detector array being placed to receive each image to thereby form at least one signal image and one reference image of the field of view. In a particularly advantageous arrangement the signal image is spectrally sub-divided into two and two signal detector arrays are provided thereby enabling the spectral profile of the signal channel to be varied.

In a convenient arrangement the system comprises a CCD TV camera having a single receiving lens and three separate CCD detector arrays providing concurrent red (R), green (G), blue (B) output signals. Advantageously, outputs are provided for separate blanking and sync pulses such that when combined with the processed signal the composite signal is formatted for display on a TV monitor. In addition, a composite signal output is preferably provided to give unprocessed image information for comparison with the processed information. The green and blue signals may be combined in an adjustable ratio to provide the image signal to match the prevailing water conditions.

In one CCD video camera used the spectral response was limited to the wavelength range of 420 nm to 670 nm. Advantageously a notch filter, e.g. a holographic filter, may be employed to cut out light between 560 nm and 600 nm. This would be effective if the red reference channel does not respond to light of wavelength less than 560 nm. In practice the channel responses are such that the arrangement works without a stopband between the signal and reference channels. Operation of the detection system is facilitated if the camera is provided with a remote control zoom lens. Preferably an inverse video selector is provided such that the target can be perceived as a bright object against a darker background as this facilitates observation.

Where there is a difference in polarisation between light in the signal and reference channels, polarisation filters can be included for improving the target discrimination.

The invention will now be described by way of example only with reference to the accompanying Drawings of which.

Figure 1:
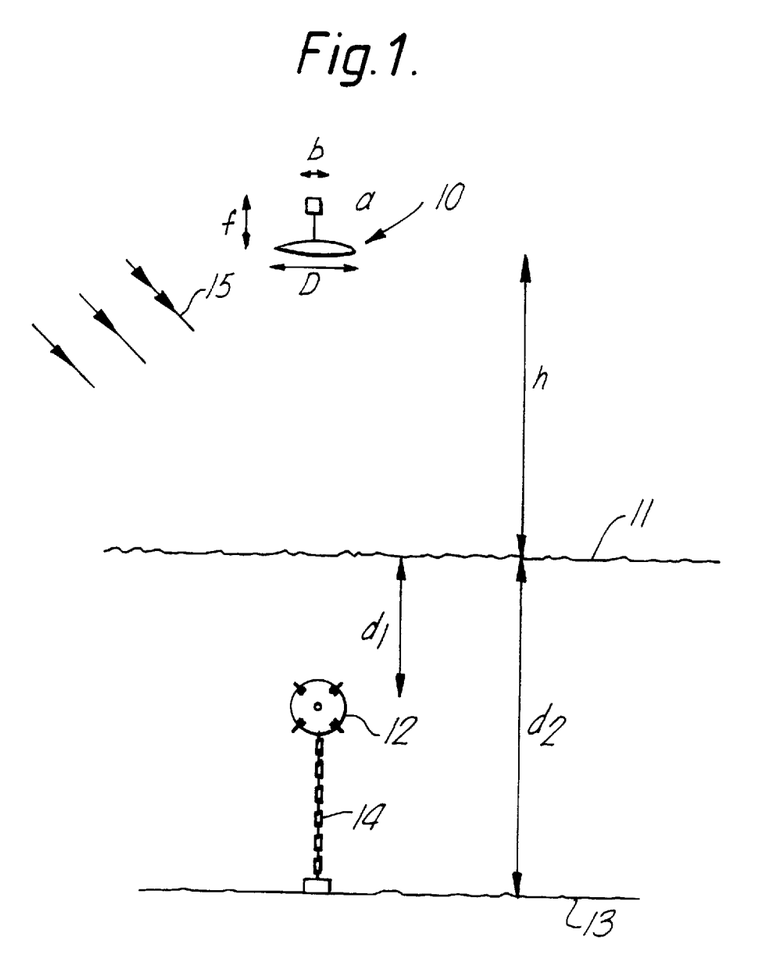
FIG. 1 is a schematic illustration of the parameters involved in detecting a submerged target.

FIG. 1 shows an electro-optical sensor 10 at a height h above the sea surface 11 which is seeking to detect a contact mine 12 moored to the seabed 13 by a mooring chain 14 such that the mine is at a depth $d_1$ below the surface 11. Light 15 from the sun and sky illuminates the field of view of the sensor 10. Light is reflected from the surface of the sea 11 and the seabed 13 as well as from the mine 12. In addition, account must be taken of the transmission properties of the light through the water and the scattering that occurs in the bulk water. These properties are wavelength dependent. The electro-optical sensor 10 is shown having a single, chromatically corrected objective lens with an entrance aperture D and a detector array (area a×b) at the focus (length f) of the lens. If the detected mine has a low reflectance $R_1$ it will be seen in negative contrast (dark against a brighter background) and there is sufficient backscatter of light from particulate matter in the sea. Conversely, it will be seen in positive contrast if the reflectance $R_1$ is high compared with the sea backscatter. In all cases, contrast is reduced by reflections from the sea surface 11.

Figure 2:
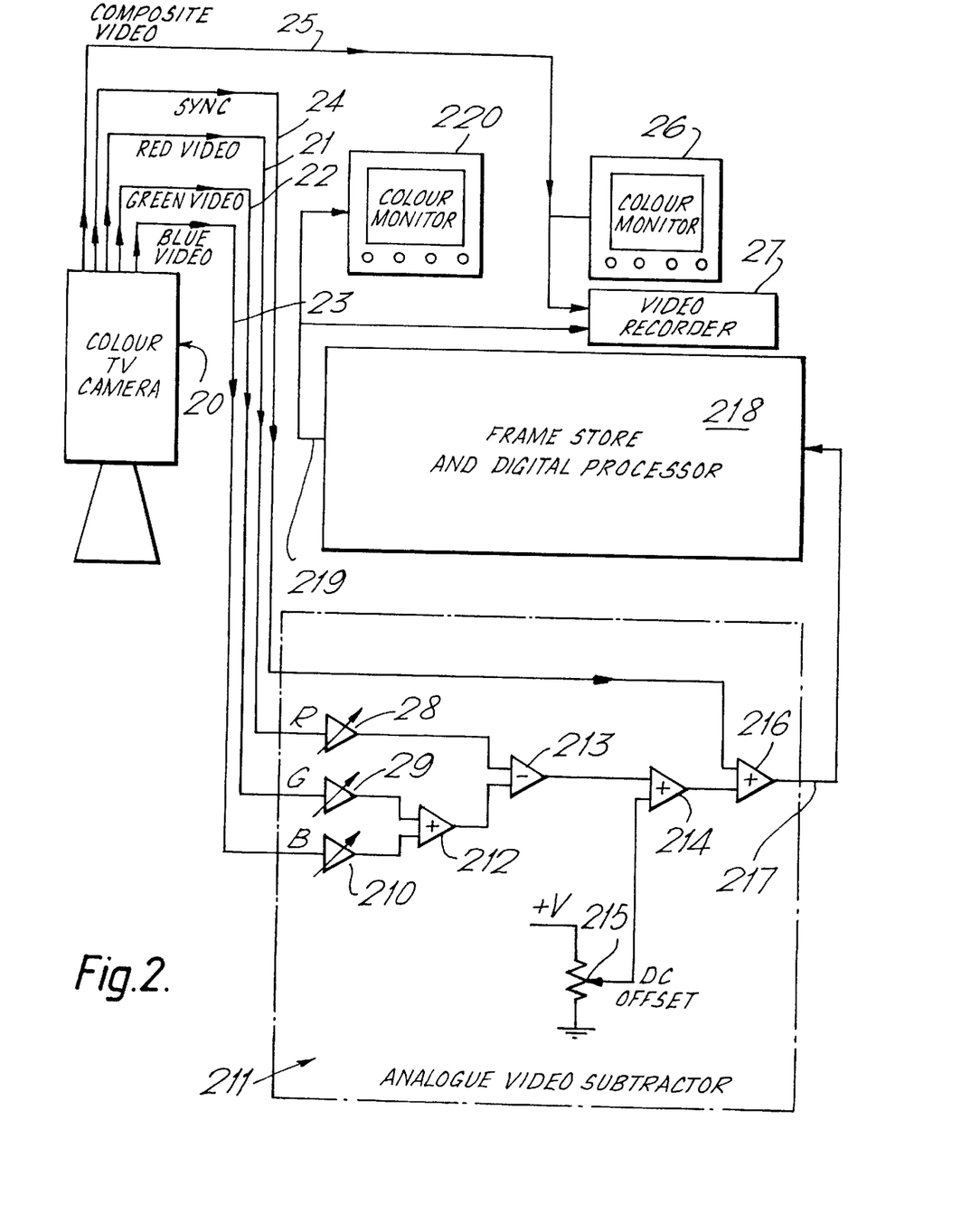
FIG. 2 is a schematic diagram of a detection system for providing enhanced target detection.
Figure 3:
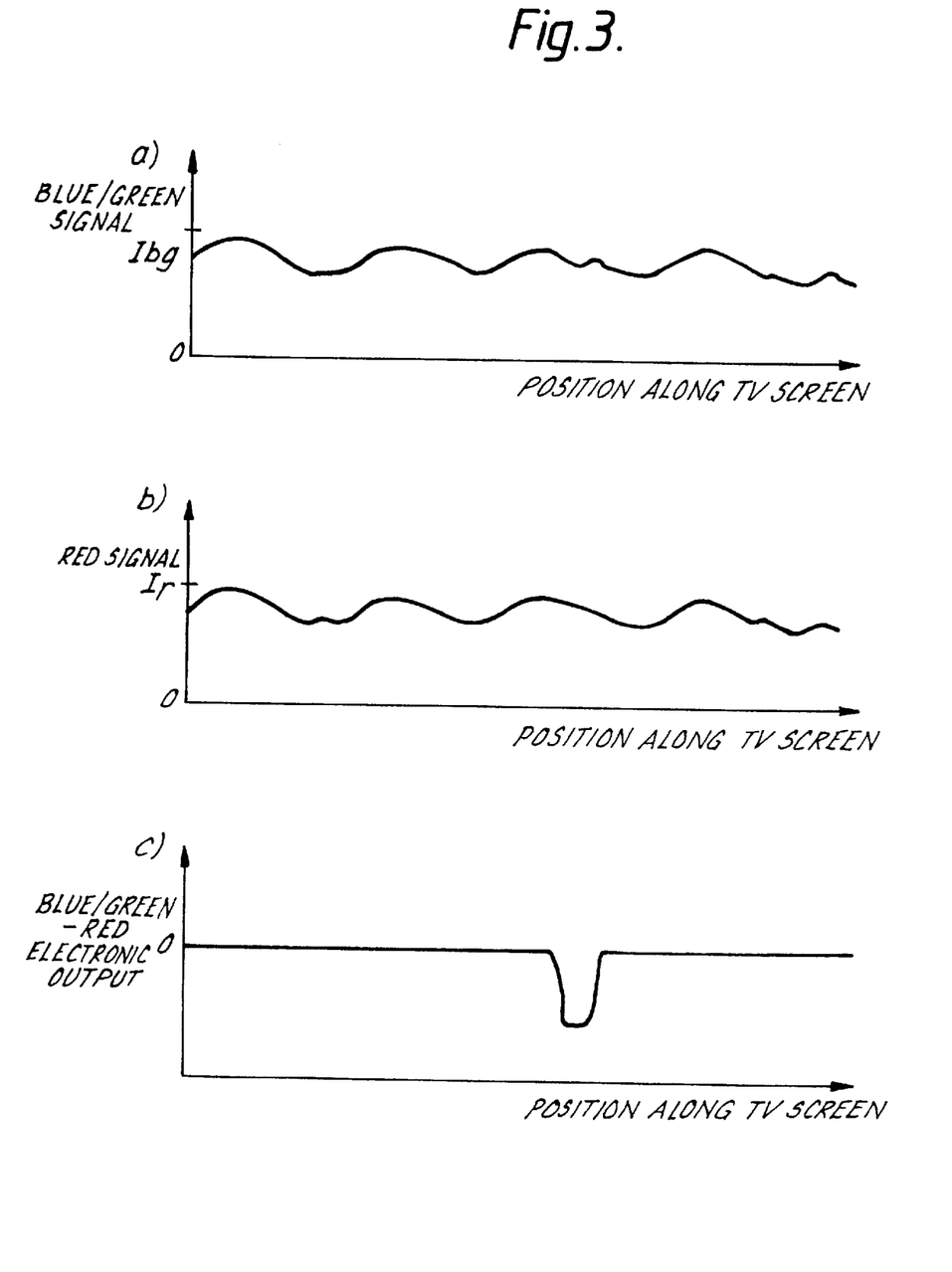
FIGS. 3, 3a–3c are concurrent video lines showing the red reference channel (b) which is subtracted from the blue-green signal channel (a) to give the enhanced image difference output signal (c)
Figure 3A:
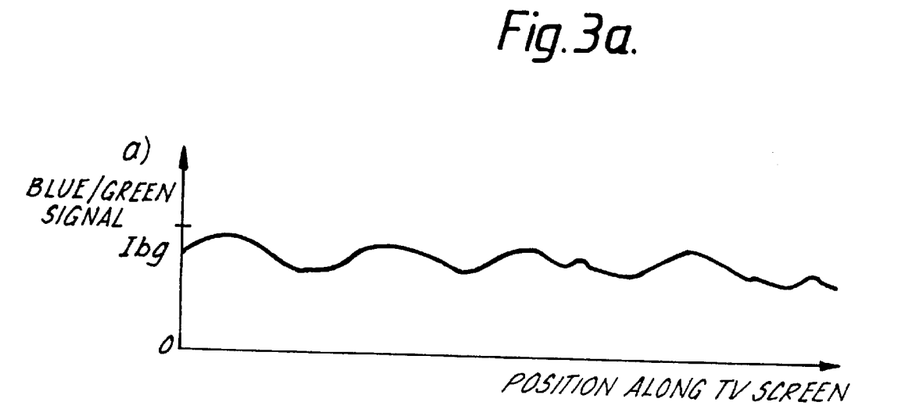
Figure 3B:
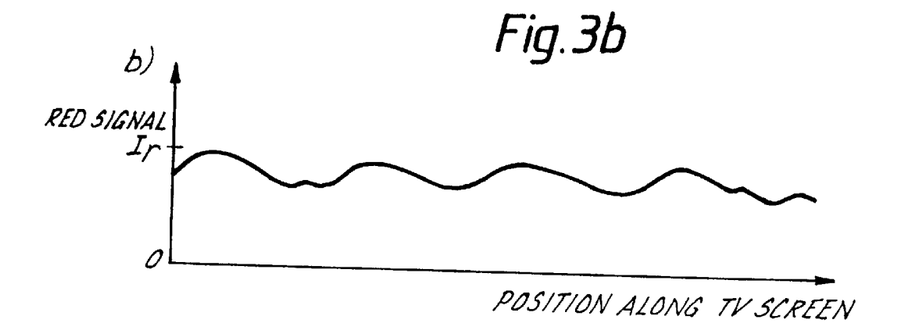
Figure 3C:
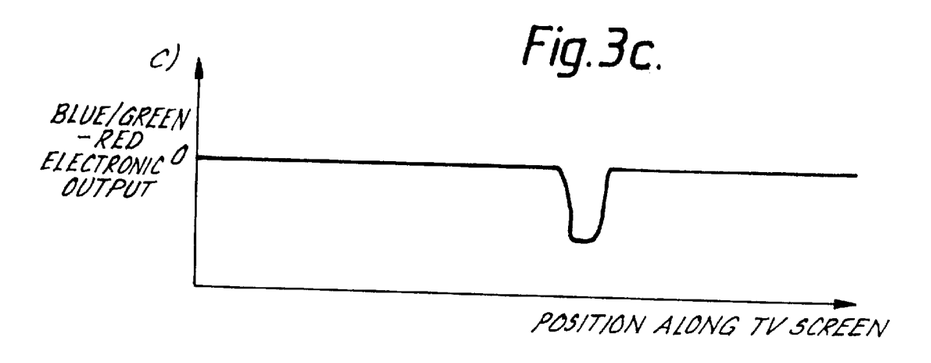

As seen in FIG. 2 the detection system includes a colour TV camera 20 with zoom lens and auto iris. The camera used is a Sony DXC-3000 which uses a 3-chip CCD (charge coupled device) solid state detector arrangement, with each chip corresponding to a separate red (R), green (G), blue (B) colour channel. The camera 20 is modified such that it provides three separate concurrent red, green and blue signal channels 21–23 without format signals and a sync output 24 providing format sync and blanking pulses, in addition to the normal composite colour (e.g. PAL format) video output 25. The unprocessed (normal) video output 25 is connected to a colour monitor 26 for real time monitoring and a VCR (video cassette recorder) 27 for post-event analysis. The R,G,B outputs 21–23 are connected to respective variable gain amplifiers 28, 29 and 210 in an analogue video subtractor (AVS) unit 211. The range of each variable gain amplifier is from 0–3, thereby providing the facility to switch off a channel as well as to amplify it. The outputs from the G and B amplifiers 29 and 210 are added in an adder 212 and the output from the R amplifier 28 is subtracted from the (G+B) sum in a subtractor 213. Since the subtraction can lead to a negative going signal a variable positive DC offset is applied to the subtractor output by an adder 214 connected to a tap 215 on a potentiometer connected to a source of voltage V. The (G+B−R) output from the adder 214 then has sync and blanking pulses added by a further adder 216. The purpose of the AVS 211 is to remove sea surface effects from the video signal. The blue and green channels are added and then the red channel is subtracted from the blue/green sum. The principle of the AVS is illustrated in FIG. 3. For simplicity of explanation the plots in FIGS. 3a, 3b and 3c each correspond to one video line across the monitor screen only. FIG. 3a shows the combined green and blue signal which consists of a contribution from above and below the sea surface. FIG. 3b shows the red signal which comes only from the sea surface because of the high absorption of red light by sea water. The gains applied to the electronic signals in FIGS. 3a and 3b have been adjusted to give the same signal level values for the sea surface contributions in each. FIG. 3c shows the effect of subtracting the red from the green/blue and adding a DC offset which is needed because the outputs shown in FIGS. 3a and 3b are AC coupled with electronically derived DC restoration. The resulting output of FIG. 3c shows the negative contrast feature very clearly.

The output 217 of the AVS 211 goes to frame store and digital processor (FSDP) 218. The FSDP 218 is supplied by PA Technology, Cambridge UK and can perform a number of real time digital processing options in series. These include:

a) edge enhancement b) frame to frame integration c) contrast stretch (histogram equalisation)

d) pseudo-colour coding e) invert video

The analogue video format output 219 of the FSDP 218 then goes to a second colour TV monitor 220 and also to the VCR 27. The VCR 27 can record either the raw signals or the processed signals.

The principal design considerations for the detection system are:

1. obtaining near perfect registration of images in all three channels;

2. selecting a detector with sufficient sensitivity and dynamic range over the spectral band of interest; and 3. achieving optimum spectral band-limiting for the three channels.

Although a CCD camera was selected with 2-dimensional detector arrays for each channel as the convenient solution to 1. image-image registration could also be achieved using digital processing but at considerably more expense and complexity.

Figure 4:
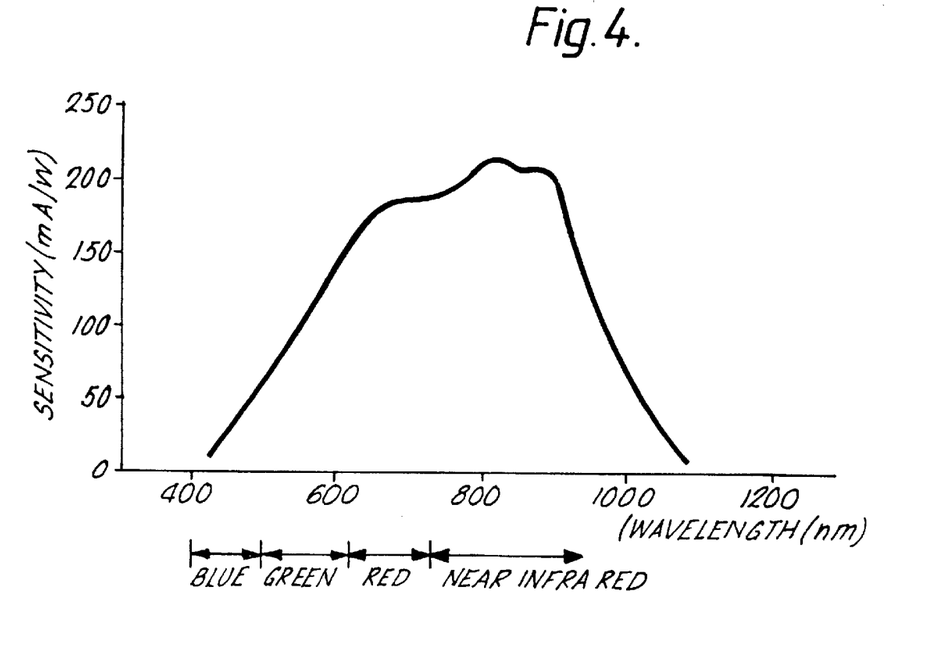
FIG. 4 is a typical spectral response curve of a charge coupled detector (CCD) sensor.

CCD's unfortunately have relatively poor sensitivity in the blue/green compared with the red as can be seen in FIG. 4. Thus image intensified CCD arrays would meet the second design requirement (2.) but construction would be more complex. The spectral sensitivity in the blue/green wavelength region shown in the Figure was considered to be adequate to provide sufficient signal to noise for a practical system.

The solution to requirement 3. of spectral balancing is very complicated since the detailed spectral transmission characteristics of the sea are unknown and vary considerably from coastal to deep water. This makes it difficult to select optimum filters. Theoretical modelling by the inventor has suggested that the blue/green channel transmission should be 400 nm to 560 nm and the red channel should be 600 nm to about 700 nm. In the practical system constructed the filters used in the CCD camera to separate the red,green and blue channels limited the spectral response to the range 420 nm to 670 nm. Preferably a notch filter, for example a holographic filter, could be placed in front of the camera lens to remove light in the waveband of 560 nm to 600 nm. This notch filter characteristic is based on theoretical considerations and in practice it has been found that satisfactory operation of the detection system was achievable without using such a filter. Although the attenuation coefficient of light varies enormously from one sea type to another, in all cases it becomes very high at wavelengths beyond 600 nm to 640 nm and thus the red is highly absorbed. In very clear water (Ocean Type 1) the minimum attenuation is in the blue (c 450 nm) and therefore backscatter of light from the depths leads to a blue hue around the mine. However, in more turbid water (e.g. Coastal 3) the minimum attenuation is overall higher than clear water but shifted to the green (c 520 nm) hence backscatter leads to a green hue. In turbid waters therefore it is desirable to open up the blue/green bandwidth to allow for the lower signal level from below the sea surface and the shift in the attenuation minima.

In a practical system it is desirable that the number of independent controls should be reduced to a minimum. The gain ratios of red to blue/green for the video subtraction can be automatically calculated and set on a frame by frame basis as can the DC offset. The only remaining video subtractor control is the blue-green balance which varies the proportion of blue and green. This only needs to be adjusted occasionally. The contrast stretch function can be automatically triggered every minute or so. A further control is the pseudo colour on/off. When selected this maps the intensity of the signal to a colour scale; hence the sought mine could appear as a red dot on a blue background. Selection of processed or raw data to the video monitor enables the operator to study unexpected signals.

Figure 5:
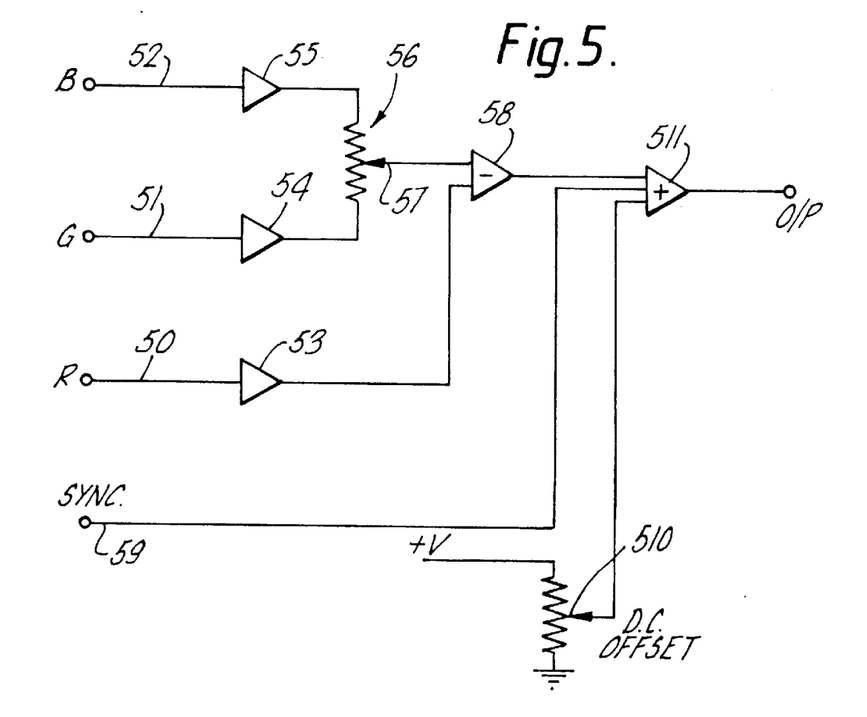
FIG. 5 is a block diagram of an alternative analogue video subtractor unit.

An alternative simpler analogue video subtractor is shown in FIG. 5. The R,G,B lines 50–52 are connected to respective buffer amplifiers 53–55. The blue and green channels are adjustably combined by connecting the signals to a potentiometer 56 with a variable centre tap 57 carrying the composite blue/green signal. As before the red channel is subtracted from the blue/green channel (in the subtractor 58) and the video synchronising signals at the input 59 and the DC offset (510) are added to the [(B/G)–R] signal in adder 511.

Figure 6A:
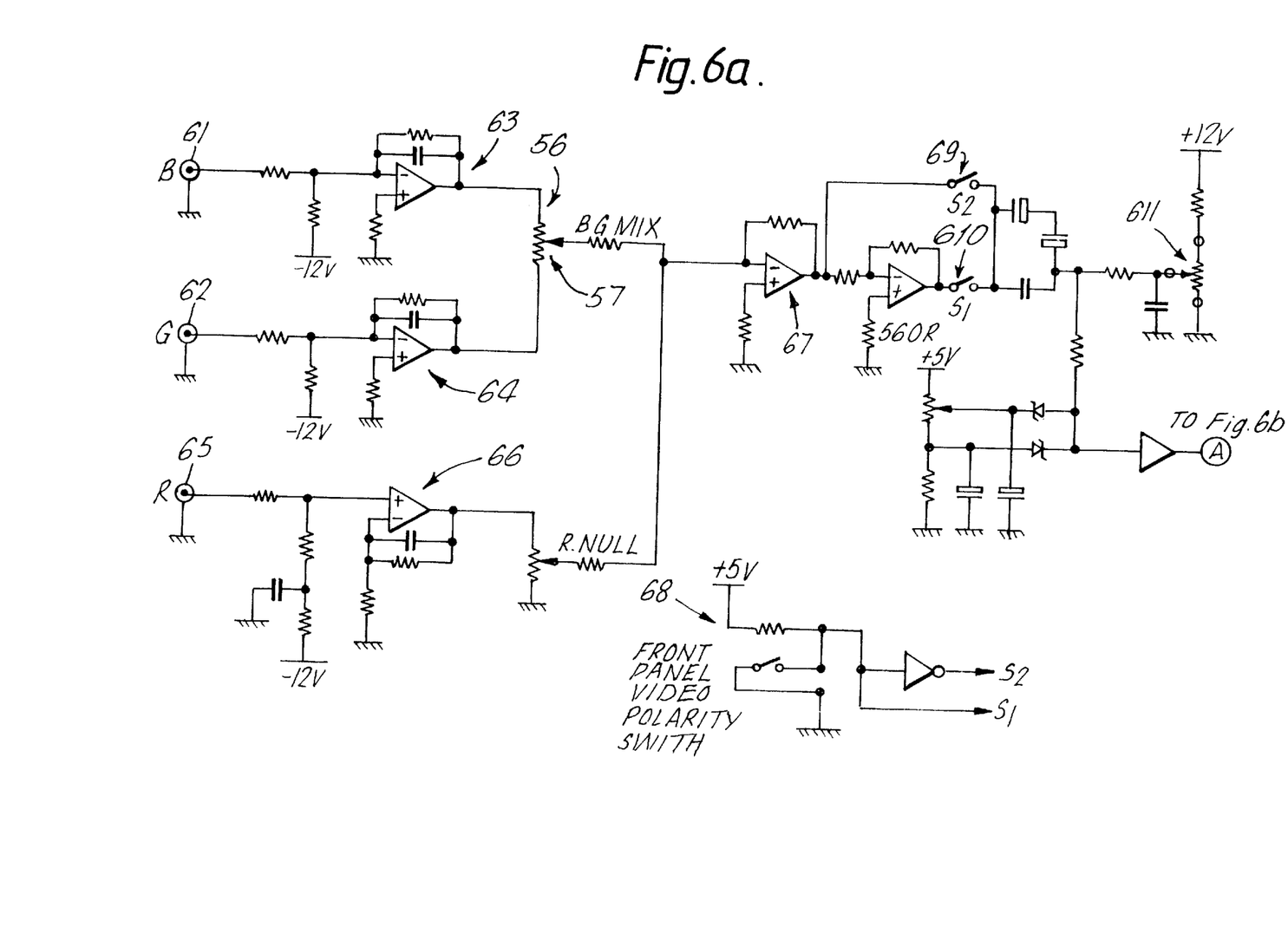
FIGS. 6a and 6b are complementary parts of a detailed circuit diagram used to process the video information.
Figure 6B:
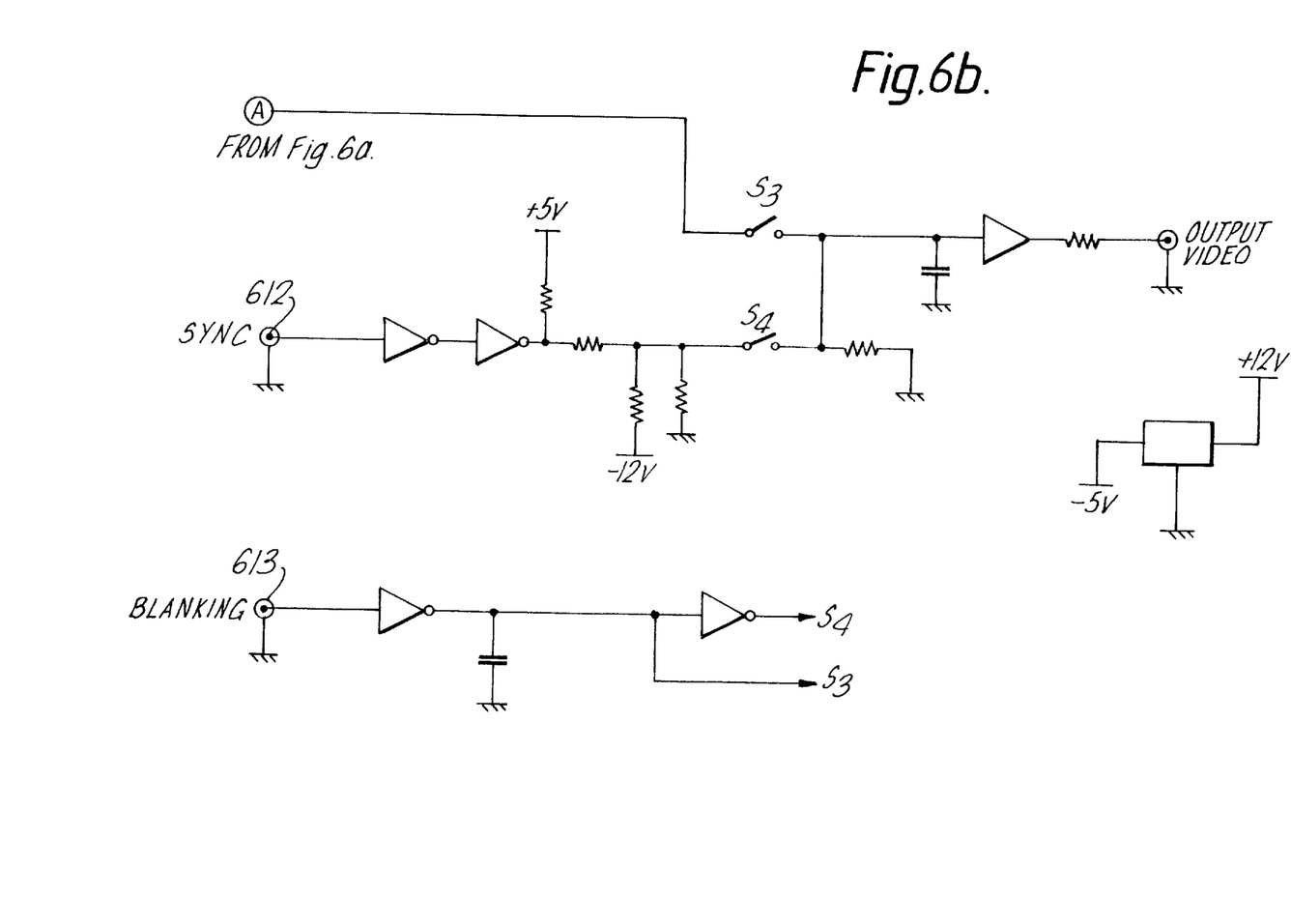

A detailed circuit diagram is shown in FIG. 6. The choice of a three channel CCD colour camera with its inherently good linearity and registration between channels allows use of a simple subtraction unit concept. There is no need to digitally store the full video frame and apply mapping techniques to align the separate channels before subtraction and thus an analogue real time technique can be used. The blue and green colour channels 61 and 62 are buffered by inverting amplifiers 63,64 and the red channel 65 uses a unit gain non-inverting buffer 66. The summing amplifier 67 receives the outputs of these channels and inverts the signal. A video polarity switch 68 is connected to the circuit at points 69,610 and a DC offset 611 is also applied. Synchronising and blanking pulses at inputs 612, 613 are added to the processed signal via switches $S_3$ and $S_4$.

As mentioned above, signal discrimination can be increased by taking out the overlap spectral region between the reference and signal channels. This can be achieved by including "notch" filters in the channels. For some applications it would be desirable to include electronic signal processing for automatic target signal detection. In addition where there is a difference in polarisation between signal and background, polarisation filters can be included to improve target discrimination.

A detailed description of the operation of the electronic circuitry has not been given as this will be apparent to those skilled in the art and modifications to the circuits will also be apparent. The sensor arrangement has been described in a basic practical form and refinements such as those indicated above will also be apparent while still falling within the scope of the invention described herein.

I claim:

1. An electro-optical detection system for detecting objects embedded within a partially transmitting medium wherein the transmittance of said medium varies at at least two wavelengths, said system comprising:
   a. means to receive electromagnetic radiation;
   b. means to separate the received radiation into two spectral channels;
   c. at least one detector responsive to electromagnetic radiation and located to receive radiation in each of the respective spectral channels; and
   d. a signal processor connected to the output of the detector;

the processor comprising:
   a signal channel means, having a wavelength and bandwidth where transmission of light of said signal channel wavelength in the medium is high, for providing a high signal to noise ratio;
   a reference channel means, having a wavelength and bandwidth where attenuation of light of said reference channel wavelength in the medium is high and said reference channel wavelength is close to the signal wavelength, comprising a means for ensuring that reflected light at both signal and reference wavelengths are of similar intensity and geometric distribution;
   and a subtracter means for providing a different output wherein the signal and reference channels are subtracted so as to remove the effect of reflected light.

2. An electro-optical detection system for detecting objects underwater as claimed in claim 1 wherein the signal channel is in the waveband 400 nm to 570 nm and the reference channel is in the waveband 570 nm to 700 nm.

3. An electro-optical detection system as claimed in claim 1 wherein the analogue subtracted signal is connected to a variable offset DC control so that a positive going signal results from the subtraction.

4. An electro-optical detection system as claimed in claim 3 wherein the DC corrected analogue subtracted signal is connected to an adder where sync pulses are added for operation of a video monitor.

5. An electro-optical detection system as claimed in claim 4 wherein the video signal is processed digitally to provide an enhanced image of the field of view.

6. An electro-optical detection system as claimed in claim 5 wherein the digital signal is digital to analogue converted and then connected to a TV monitor.

7. An electro-optical detection system as claimed in claim 6 wherein after processing the signal is connected to an automatic detection system to give an automatic cue on detection of a target.

8. An electro-optical detection system as claimed in claim 7 wherein the means to receive the radiation from the field of view comprises a single chromatically corrected lens; radiation transmitted by the lens being spectrally divided to provide at least two separate images, a two dimensional detector array being placed to receive each image to thereby form at least one signal image and one reference image of the field of view.

9. An electro-optical detection system as claimed in claim 8 wherein the signal image is spectrally sub-divided into two and respective signal detector arrays are provided thereby enabling the spectral profile of the signal channel to be varied.

10. An electro-optical detection system as claimed in claim 9 wherein the system comprises a CCD TV camera having a single receiving lens and three separate CCD detector arrays providing concurrent red (R), green (G), blue (B) output signals.

11. An electro-optical detection system as claimed in claim 10 wherein outputs are provided for separate blanking and sync pulses such that when combined with the processed signal the composite signal is formatted for display on a TV monitor.

12. An electro-optical detection system as claimed in claim 11 wherein a composite signal output is provided to give unprocessed image information for comparison with the processed information.

13. An electro-optical detection system as claimed in claim 12 wherein the green and blue signals are combined in an adjustable ratio to provide the image signal to match the prevailing conditions of the partially transmitting medium.

14. An electro-optical detection system as claimed in claim 13 wherein the CCD video camera spectral response is limited to the wavelength range of 420 nm to 670 nm.

15. An electro-optical detection system as claimed in claim 14 wherein a notch filter is employed to cut out light in a spectral band between 560 nm and 600 nm between the signal and reference channels.

16. An electro-optical detection system as claimed in claim 15 wherein the camera is provided with a remote control zoom lens.

17. An electro-optical detection system as claimed in claim 16 wherein an inverse video selector is provided such that a target can be perceived as a bright object against a darker background to facilitate observation.

18. An electro-optical detection system as claimed in claim 17 where there is provided at least one polarisation filter improving the target discrimination.

* * * * *